July 5, 1960

J. MOSELEY 2,943,644

FLEXIBLE HOSE

Filed Feb. 1, 1957

Inventor
John Moseley
By Mason, Nolte and Nolte
Attorneys

United States Patent Office 2,943,644
Patented July 5, 1960

2,943,644

FLEXIBLE HOSE

John Moseley, South Wimbledon, London, England, assignor to Compoflex Company Limited, London, England Filed Feb. 1, 1957, Ser. No. 637,679

6 Claims. (Cl. 138—56)

This invention has for its object to provide a flexible hose for use in conveying liquid oxygen, nitrogen, argon and similar gases having an extremely low boiling point.

The hose according to the invention comprises a body including layers of polyethylene terephthalate, such as that marketed under the trade name "Dacron," and layers of cloth woven from polyethylene terephthalate fibre. It is normal practice in the manufacture of flexible hose for other purposes to bond together the layers of sheet material constituting the body of the hose. In the hose according to the invention, however, the constituent layers of the body of the hose are unbonded and are held together solely by means of internal and external wire armourings.

Two embodiments of flexible hose according to the invention will now be described in more detail, by way of example, with reference to the accompanying drawing, in which.

Like reference numerals denote like parts throughout the figures.

Figure 1:
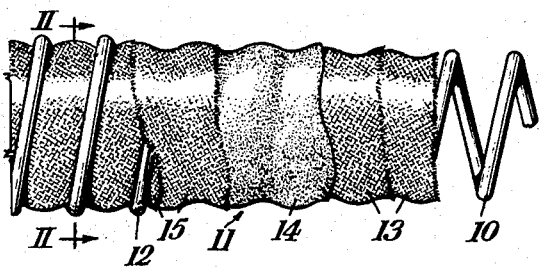
Fig. 1 is a side elevation, partly broken away, of the first form of hose.
Figure 2:
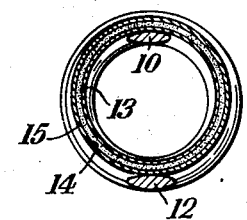
Fig. 2 is a section on the line II—II in Fig. 1.
Figure 3:
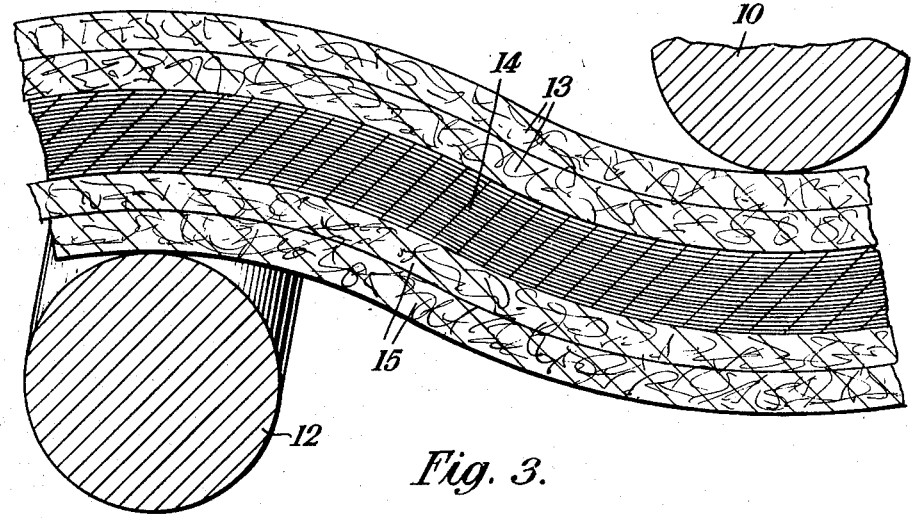
Fig. 3 is a section on a greatly enlarged scale through the wall of the hose shown in Fig. 1.

The hose shown in Figs. 1–3 comprises an inner helix 10 of 12 gauge stainless steel wire, wound at ½ inch pitch, a body 11 and an outer helix 12 of 12 gauge stainless steel wire wound at ½ inch pitch with its turns situated between the turns of the inner helix 10. In manufacture, the inner helix 10 of wire is first wound on a mandrel, the constituent layers of sheet material constituting the body 11 of the hose are then wound in succession convolutely around the mandrel, and the outer helix 12 of wire is applied. The hose is then removed from the mandrel without curing and is ready for use as such.

The body 11 of the hose comprises two inner layers 13 of 12 ounce cloth woven from polyethylene terephthalate yarn, twenty layers 14 of polyethylene terephthalate film of thickness .0015 inch and two outer layers 15 of 12 ounce cloth woven from polyethylene terephthalate cloth.

Figure 4:
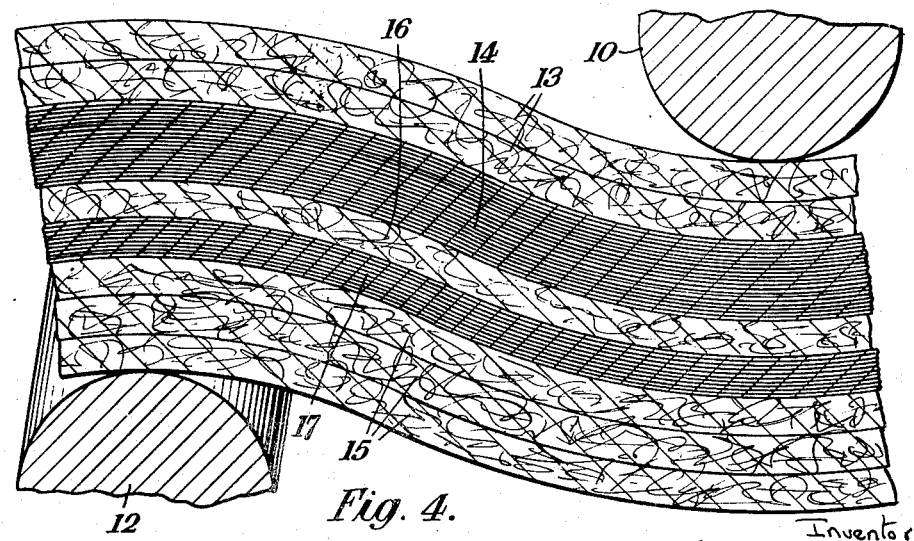
Fig. 4 is a view similar to Fig. 3 showing the other form of hose.

The hose shown in Fig. 4 is made in precisely the same way and differs only in the construction of the body. This consists of two inner layers 13 of cloth and twenty layers 14 of film identical with the corresponding layers in the hose shown in Fig. 3. Then follow a single layer 16 of 12 ounce cloth woven from polyethylene terephthalate yarn, ten layers 17 of polyethylene terephthalate film of thickness .0015 inch and finally three outer layers 15 of cloth identical with that used for the outer layers of the hose of Fig. 3.

What I claim as my invention and desire to secure by Letters Patent is:

1. A flexible hose capable of conveying liquid oxygen without loss of flexibility or embrittlement and consisting of a tubular body of polyethylene terephthalate constituted by at least one inner layer of cloth woven from polyethylene terephthalate yarn and wound in overlapping helical coils, a number of intermediate layers of polyethylene terephthalate film wound in overlapping helical coils and at least one outer layer of cloth woven from polyethylene terephthalate yarn and wound in overlapping helical coils, and external and internal armourings of metal wire fitted closely to said body and holding the constituent layers thereof together.

2. A hose according to claim 1, comprising two inner layers of cloth and two outer layers of cloth.

3. A hose according to claim 2, wherein each cloth layer is of 12 ounce cloth and comprising twenty layers of film, each of .0015 inch thickness.

4. A hose according to claim 1, wherein at least the inner wire armouring is of stainless steel.

5. A flexible hose capable of conveying liquid oxygen without loss of flexibility or embrittlement and consisting of a tubular body of polyethylene terephthalate constituted by a plurality of inner layers of cloth woven from polyethylene terephthalate yarn and wound in overlapping helical coils, a plurality of intermediate layers of polyethylene terephthalate film wound in overlapping helical coils, said intermediate film layers being divided into two groups having sandwiched between them a layer of cloth woven from polyethylene terephthalate yarn and wound in overlapping helical coils, and a plurality of outer layers of cloth woven from polyethylene terephthalate yarn and wound in overlapping helical coils, and external and internal armourings of metal wire fitted closely to said body and holding the constituent layers thereof together.

6. A flexible hose capable of conveying liquid oxygen without loss of flexibility or embrittlement and consisting of a tubular body of polyethylene terephthalate constituted by at least one tubular layer of cloth woven from polyethylene terephthalate yarn, a number of intermediate tubular layers of polyethylene terephthalate film and at least one outer tubular layer of cloth woven from polyethylene terephthalate yarn, and external and internal armourings of metal wire fitted closely to said body and holding the constituent layers thereof together.

References Cited in the file of this patent

UNITED STATES PATENTS

| | | |
|---|---|---|
| 86,652 | Davis | Feb. 9, 1869 |
| 2,512,433 | Leben | June 20, 1950 |
| 2,650,213 | Hofrichter | Aug. 25, 1953 |
| 2,739,089 | Hageltorn | Mar. 20, 1956 |

FOREIGN PATENTS

| | | |
|---|---|---|
| 25,977 | Great Britain | Nov. 23, 1907 |
| 591,307 | Great Britain | Aug. 13, 1947 |
| 627,054 | Great Britain | July 27, 1949 |